(12) United States Patent
Plester

(10) Patent No.: US 6,610,210 B2
(45) Date of Patent: Aug. 26, 2003

(54) DISPOSABLE CARTRIDGE FOR ON-PREMISES WATER TREATMENT SYSTEM

(75) Inventor: George Plester, Waterloo (BE)

(73) Assignee: The Coca-Cola Company, Atlanta, GA (US)

(*) Notice: Subject to any disclaimer, the term of this patent is extended or adjusted under 35 U.S.C. 154(b) by 131 days.

(21) Appl. No.: 09/887,495

(22) Filed: Jun. 22, 2001

(65) Prior Publication Data

US 2002/0195399 A1 Dec. 26, 2002

(51) Int. Cl.$^7$ .................................................. C02F 1/52
(52) U.S. Cl. ........................ 210/737; 210/800; 210/806; 210/175; 210/182; 210/256
(58) Field of Search ............................... 210/702, 737, 210/800, 806, 175, 182, 256

(56) References Cited

U.S. PATENT DOCUMENTS

| | | |
|---|---|---|
| 314,150 A | 3/1885 | Roeske |
| 661,189 A | 11/1900 | Olsen et al. |
| 2,347,927 A | 5/1944 | Paterson et al. |
| 2,595,913 A | 5/1952 | Baily |
| 3,831,757 A | 8/1974 | Gossett et al. |
| 3,873,445 A | 3/1975 | Bussard |
| 3,882,693 A | 5/1975 | Hiller |
| 3,974,075 A | 8/1976 | Saigh et al. |
| 4,066,550 A | 1/1978 | Beaumont |
| 4,120,787 A | 10/1978 | Yargeau |
| 4,483,769 A | 11/1984 | Sherman |
| 4,588,500 A | 5/1986 | Sprenger et al. |
| 4,606,823 A | 8/1986 | Lucas, III |
| 4,759,474 A | 7/1988 | Regunathan et al. |
| 4,761,295 A | 8/1988 | Casey |
| 4,844,796 A | 7/1989 | Plester |
| 4,892,653 A | 1/1990 | Latge |
| 4,948,499 A | 8/1990 | Peranio |
| 4,957,200 A | 9/1990 | Turner et al. |
| 4,957,624 A | 9/1990 | Peranio |
| 5,017,284 A | 5/1991 | Miler et al. |
| 5,160,444 A | 11/1992 | McFarland |
| 5,215,655 A | 6/1993 | Mittermaier |
| 5,254,243 A | 10/1993 | Carr et al. |
| 5,256,279 A | 10/1993 | Voznick et al. |
| 5,443,739 A | 8/1995 | Vogel et al. |
| 5,587,055 A | 12/1996 | Hartman et al. |
| 5,647,269 A | 7/1997 | Miller et al. |
| 5,679,243 A | 10/1997 | Cho |
| 5,755,957 A | 5/1998 | Jeon |
| 5,776,333 A | 7/1998 | Plester et al. |
| 5,837,147 A | 11/1998 | Joung |

(List continued on next page.)

FOREIGN PATENT DOCUMENTS

| | | |
|---|---|---|
| DE | 444 422 C | 5/1927 |
| DE | 40 28 529 A1 | 3/1992 |
| DE | 195 34 454 A1 | 3/1997 |
| EP | 0 312 079 A2 | 4/1989 |

(List continued on next page.)

Primary Examiner—Betsey Morrison Hoey
(74) Attorney, Agent, or Firm—Sutherland Asbill & Brennan LLP

(57) ABSTRACT

A disposable cartridge device is provided for use in a heated cartridge water treatment system in which particles, formed by the heat-induced reaction of bicarbonates in the water, can be efficiently collected in non-turbulent particle settling zones. The cartridge includes multiple containers which are assembled to fit into each other and which form channels for the flow of water within gaps between the walls of the containers. When the particle collecting section becomes full, the water flow automatically is blocked, or cut-off, which signals the need to replace the cartridge. The cartridge also can include a polishing filter and a heater mounted to a surface of the outer container.

37 Claims, 3 Drawing Sheets

U.S. PATENT DOCUMENTS

| | | |
|---|---|---|
| 5,858,248 A | 1/1999 | Plester et al. |
| 5,889,684 A | 3/1999 | Ben-David et al. |
| 6,101,835 A | 8/2000 | Butsch et al. |
| 6,155,460 A | 12/2000 | Lee |
| 6,264,830 B1 | 7/2001 | Plester et al. |
| 6,495,049 B1 | 12/2002 | Van Esch |

FOREIGN PATENT DOCUMENTS

| | | |
|---|---|---|
| EP | 0 337 455 | 10/1989 |
| GB | 2 238 532 A | 6/1991 |
| WO | 96/24390 | 8/1996 |
| WO | 96/30309 | 10/1996 |
| WO | 00/25887 A1 | 5/2000 |
| WO | 01/19734 A1 | 3/2001 |

DISPOSABLE CARTRIDGE FOR ON-PREMISES WATER TREATMENT SYSTEM

FIELD OF THE INVENTION

The present invention generally relates to devices and methods for water treatment, particularly for use in a post-mix beverage dispenser.

BACKGROUND OF THE INVENTION

The on-premises water treatment system and method described in U.S. Pat. No. 5,858,248 to Plester et al. utilizes a removable, disposable cartridge that includes a collector and a filter. The collector is disclosed to have a mesh structure. A heater heats water in the cartridge into order to breakdown bicarbonate hardness in the water. Precipitated carbonates and heavy metals are then deposited and collected on the surface of the mesh structure. Water from the collector then passes through a polishing filter, e.g., a ring filter, and exits the cartridge.

The effectiveness of the collector depends, in part, on control of the temperature and residence time of the water passing through the cartridge. In operation, the residence time decreases as the deposits accumulate and fill voids in the mesh structure. This accumulation process eventually causes the residence time to decrease below that needed to complete the precipitation process. The cartridge therefore is designed for the polishing filter to have a shorter useful life than the collector; a blocked filter signals the need for collector maintenance (i.e. replacement). It would advantageous to have an improved particle collection cartridge, particularly one designed to satisfy the following parameters:

A. To ensure that all parts of water flowing passing through the cartridge are treated to the same extent, the cartridge should provide a narrow distribution of in-cartridge residence time within the water flow;

B. The cartridge should provide efficient settling and collection of small particles formed during the heat induced reaction within the cartridge;

C. Blockage of the water inlet to the cartridge should be avoided by minimizing the deposition of particles forming, due to the heat induced reaction, just inside the water entry point to the cartridge;

D. Particle deposition on the heater surfaces of the cartridge also should be avoided, since such formation is detrimental to performance of the heater and cartridge;

E. The cartridge should provide complete separation of inlet and outlet water flow, so that leaks in the system cannot result in the mixing of the incoming untreated water with the outgoing treated water;

F. The cartridge should accommodate a polishing filter for the treated outgoing water, to remove any fine particles which carry over from the settling zones of the cartridge;

G. The cartridge should accommodate either an internally-mounted heater or an externally-mounted heater;

H. The cartridge should inherently block water flow through the cartridge when cartridge's free internal space has been reduced by reaction particle deposition to an extent that the residence time of the water within the cartridge has reached a lowest limiting value, that is when the cartridge is "spent" and must be replaced;

I. The cartridge should provide good thermal contact with a heater mounted outside the cartridge, for those embodiments where such externally-mounted heaters are preferred;

J. The cartridge should provide water contact surfaces that can be effectively and economically lacquered to prevent metal contamination of treated water, particularly for embodiments using inexpensive metals such as mild steel;

K. The cartridge should provide lacquered heating surfaces that avoid deposits, so as to avoid subjecting the lacquer surfaces to unacceptable thermal stress; and L. The cartridge should be a simple construction, of low cost, thereby enabling the cartridge to be a relatively inexpensive part of the water treatment system.

It would therefore be advantageous to develop a water treatment cartridge that minimizes the deposition of particles forming just inside the water entry point to the cartridge, that avoids particle deposition on the heater surfaces of the cartridge, and that provides complete separation of inlet and outlet water flow to and from the cartridge. It would furthermore be advantageous for such a cartridge to accommodate either an internally-mounted heater or an externally-mounted heater, wherein the cartridge inherently blocks water flow therethrough when the cartridge's free internal space has been reduced by reaction particle deposition to an extent that the residence time of the water within the cartridge has reached a lowest limiting value, and wherein the water contact surfaces of the cartridge can be effectively and economically lacquered.

It is therefore an object of the present invention to provide a cartridge device for use in a heated cartridge water treatment system which meets many or all of these design parameters.

It is another object of the present invention to provide methods and water treatment systems which utilize such improved cartridge devices.

SUMMARY OF THE INVENTION

An improved cartridge device is provided for use in a water treatment system, such as the system described in U.S. Pat. No. 5,858,248. The cartridge includes multiple containers that are nested together and which form particle settling zones and channels for the flow of water within gaps between the walls of the containers. The cartridge is cost effective because it utilizes conventional, mass-produced parts and only simple assembly is needed.

In a preferred embodiment, the cartridge device includes (i) an outer container having a closed base, an open top end, and vertical walls disposed between the base and the top end, wherein the open top end can be sealably engaged with a headpiece of the heated cartridge water treatment system; (ii) an inner container having a closed base, a top end having at least one opening through which water to be treated can flow into the inner container, and vertical walls disposed between the base and the top end, wherein the vertical walls of the inner container are provided with at least one aperture through which water in the inner container can flow out of the inner container, a particle settling zone being defined between the aperture and the base of the inner container, and wherein the inner container is secured within the outer container in a position forming a gap between the walls of the outer container and the walls of the inner container and a gap between the base of the outer container and the base of the inner container; (iii) a first intermediate container disposed within a second intermediate container, disposed between the outer container and the inner container, wherein the intermediate containers have a closed base, an open top end, and vertical walls disposed between the base ends and the top ends, wherein water in the water flow path flows over the top end of the first intermediate container and then through apertures in the walls of the second intermediate container; and (iv) a treated water outlet positioned for receiving water from the gap between the top end of the outer container and the top end of the inner container. The containers forming the cartridge preferably are made of a metal, and can be lacquered to prevent metal contamination of the treated water. In this embodiment, the cartridge enables a heater for the treatment system to be optionally installed within the treated water flow or against an outer cartridge wall. A polishing filter, such as a depth filter, preferably is provided with the cartridge.

The cartridge includes a section for non-turbulent flow for the collection of particles formed inside the cartridge by the reaction of bicarbonates in the water, thus providing efficient particle collection. When the particle collecting section becomes full, the water flow automatically is blocked, or cut-off, which signals the need to replace the cartridge. In preferred embodiments where 50% of the water flow path is in the same direction as the settling direction of the particles, settling is also more effective.

In a more preferred embodiment, the cartridge device includes (i) an outer container having a closed base, an open top end, and vertical walls disposed between the base and top end, wherein the open top end can be sealably engaged with a headpiece of a heated cartridge water treatment system; (ii) an inner container having a closed base, an open top end, and vertical walls disposed between the base and top end, wherein the inner container is secured within the outer container in a position forming a gap between the walls of the outer and inner containers and a gap between the bases of the inner and outer containers, such that a particle settling zone is defined between said bases; (iii) one or more outer baffles secured in the gap between the walls of the outer container and inner containers, and defining a flow path such that when untreated water enters the cartridge through an inlet feedpipe, the water flows between the wall of the outer container and at least one of the outer baffles toward the particle settling zone and then passes between the outer baffle and the wall of the inner container; and (iv) a treated water outlet positioned for receiving water from the top end of the inner container, wherein water flowing out of the inner container flows through the treated water outlet and out of the cartridge device, thereby defining a water flow path through the cartridge device.

DETAILED DESCRIPTION OF THE INVENTION

Figure 1:
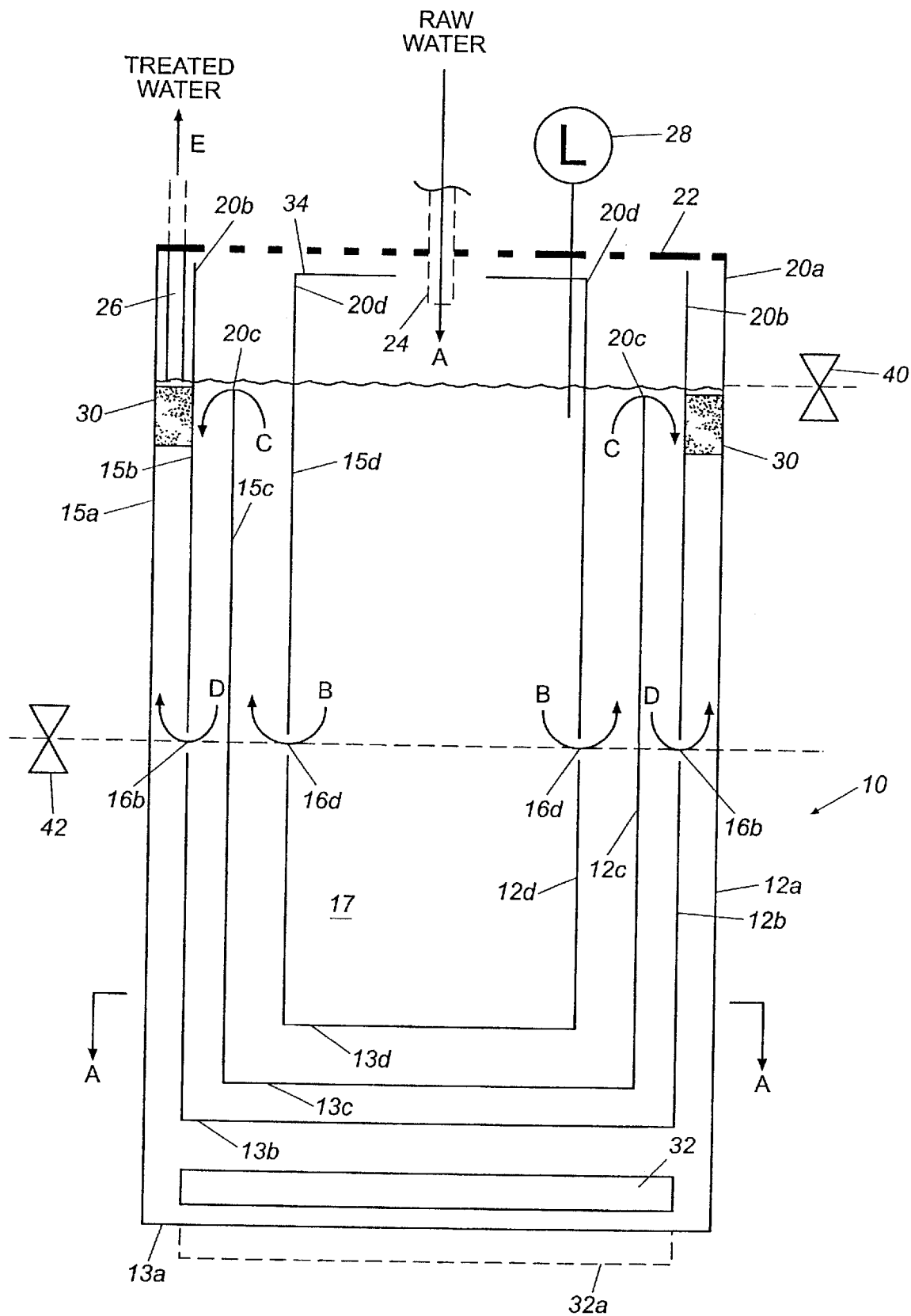
FIG. 1 is a vertical sectional view of a preferred embodiment of the cartridge, indicating the water flow paths, heat application, and provision for collecting settled particles.

An improved disposable, replaceable cartridge device has been developed for use in heated cartridge water treatment systems and methods, such as those described in U.S. Pat. No. 5,858,248, which is hereby incorporated by reference in its entirety.

The Cartridge

The cartridge is composed of multiple containers, wherein each container has walls and a closed base. The containers preferably are cylindrical in shape, although non-circular horizontal cross-sectional shapes can be used. The cartridge's containers are arranged essentially concentrically to form flow paths (i.e. channels) in the gaps between the container walls. In other words, the containers are nested with one disposed inside another. The channels formed by the gaps between the walls of the containers ensure that all parts of the flow must follow the same path—eliminating short circuiting—and therefore ensuring a narrow distribution of residence time for the water flowing through the cartridge. Conventional spacers can be used to maintain the gaps between the containers. Apertures are provided in the containers to complete the desired water flow circuit, as more completely described in the paragraphs below with reference to FIGS. 1 and 2. Settling zones for the precipitated particles are defined in the containers below the apertures. In certain embodiments, the "containers" have no closed base, but only side walls; these "containers" are referred to herein as "baffles."

The containers typically are constructed of a heat conducting material, preferably a metal. In a preferred embodiment, the containers are constructed of tin-plated mild steel or aluminum, having a lacquer coating to inhibit corrosion of the metal. In other embodiments, the containers, or parts thereof, are constructed of a non-lacquered metal, such as a stainless steel. Stainless steel can be a cost effective material, particularly for the internal containers for which very thin metal construction can be used due to the insubstantial mechanical strength requirements of the internal containers.

The cartridge design also reduces thermal stress on lacquered walls, when lacquered walls are employed, thus beneficially permitting the use of conventional anti-corrosion lacquers, which otherwise would be affected by higher temperatures and stresses. Although anti-corrosion lacquers with high temperature tolerance exist, the cost-effectiveness of the lacquer system can be achieved more easily when the lacquer system operates at as low temperature as possible, which in practice is the temperature of the treatment process. Typically, the temperature of the lacquer and metal substrate will be close to the temperature of water in contact with it, wherein the water is at the temperature of the treatment process. However, if the heated surface gets coated by a deposit of calcium or magnesium carbonate from the treatment process, then the lacquered surface no longer is directly in contact with the water. In this event, the heater temperature would rise to maintain the necessary heat flow through the deposit, which is a poor conductor of heat. This increase in heater temperature consequently would increase the thermal stress on the lacquered surface. Therefore, if deposits on the lacquered surfaces which are directly heated can be minimized, or avoided, the thermal stress on the lacquer is minimized.

It is a simple matter to lacquer the containers using conventional means so as to provide protection against metal corrosion. Conventional lacquer materials currently used in food cans, particularly those intended to permit in-can cooking (such as certain soup cans) can be used. Lacquer materials will commonly have a polyester, acrylic or epoxy base, preferably polyester or acrylic, since these are water based and most easy to apply in a high-speed lacquering system. Conventional, high speed lacquering systems (such as used in lacquering food and beverage cans) are economical, but rely on avoidance of complex shapes and surfaces, as these would reduce the integrity of the lacquer's cover. Lacquer surfaces that are more complex (than food cans) generally would require more complicated and less cost-effective lacquering systems.

Heater

In one embodiment, the cartridge utilizes an externally mounted heater. In this embodiment, the heater directly heats the outgoing treated water and indirectly heats the untreated water (see FIG. 1). Therefore, the container surfaces with the highest thermal stress are in contact with the treated water and thus subjected to little particle deposition from the reaction in the cartridge relative to container surfaces in contact with untreated water. This design beneficially avoids having the surfaces in contact with the heater covered with particle deposits, which would act as heat insulation and would increase the thermal stress across the lacquers. By reducing the thermal stress across the lacquer, the risk of lacquer heat-damage is reduced.

The dimensions of the containers depends on the size of cartridge, which in turn depends mainly on the water treatment rate and the treatment temperature. The cartridge has at least three main process sections, each corresponding to the different process functions of the cartridge. These are (1) the reaction section, where the bicarbonate is decomposed by heat and precipitates carbonates together with metals and other dissolved solids; (2) the precipitate-holding section, which accumulates most of the precipitated solids; and (3) the service ancillaries section, containing polishing filter, gas space for collecting and releasing gases dissolved in the untreated water, control probes for level, temperature (if needed), and infeed/outlet pipes.

The size of the reaction section of the cartridge is determined by the required water treatment rate and treatment temperature, since the temperature dependence of the bicarbonate reaction follows well-known laws of chemistry. For example, if the treatment temperature were 115° C., this section preferably would need to have a volume sufficient to hold approximately 10 minutes worth of the water treatment flow (that is, for example, if treatment rate were 18 L/hr, the volume of the reaction section would be about $10/60 \times 18 = 3$ L). At temperatures less than 115° C., the volume needed would be greater because the reaction rate would be lower, and at temperatures greater than 115° C., the volume needed would be less because the reaction rate would be higher. Although higher treatment temperatures are beneficial in reducing the cartridge size, the higher temperatures increase the internal pressure of the cartridge. Treatment temperature therefore must be selected to strike a practical and economic balance between the cartridge's pressure-holding strength and its size. Preferred treatment temperatures typically are between about 100° C. and about 150° C. Temperatures outside this range, however, may be useful for particular applications. For example, if an application required a very small, space-saving cartridge, then a higher treatment temperatures could be employed.

The size of the precipitate-holding section depends on the water treatment rate, the amount of precipitatable matter in the water, and the acceptable frequency of cartridge-changing. It is simply a holding space for the solids extracted by the treatment process.

The size of the service ancillaries section depends on water treatment rate and on the degree of space-saving of the layout design of the components within this section. Typically, this size of this section composes a relatively minor fraction of the cartridge. For example, with a water treatment rate of 18 liters/hour operating at 115° C., a cartridge typically will have a total volumetric capacity of between about 4 and 8 L, only about 0.5 L of which normally would be required for the service ancillaries section.

Typically, the shape of the cartridge is such that its height is about one to three times its diameter.

Mounting the heater outside the cartridge and thus making it a permanent, rather than disposable, part reduces the cost of the disposable component (i.e. the cartridge) and thus reduces the operating cost of the system. However, this arrangement is not always possible, because hard waters (i.e. relatively high bicarbonate content) cause excessive deposits on the surfaces heated externally and reduce their efficiency. In such cases, an internal heater is preferred or perhaps necessary, since the internal heater self-cleans during heating and cooling cycles. Thermal stress on deposits directly on the heater is much higher than in the case of deposits on externally-heated surfaces, and this thermal stress causes the deposits directly on the heater to fall away. Therefore, the option of internally-heating, although intrinsically more expensive due to the increase of the number of disposable components can reduce cost in the case of relatively hard water by enhancing the service life of the cartridge.

Polishing Filter

The cartridge optionally and preferably is provided with a polishing filter to remove any fine particles that have failed to settle within the settling zones of the cartridge. The polishing filter should be compact and simple to install in the cartridge.

The polishing filter should not limit the life of the cartridge. (Rather, the life of the cartridge should be limited by the capacity of the cartridge's settled-particle collection zone.) The polishing filter should, however, have an adequate operating life within the confined space of the cartridge, a function which can be achieved with a filter that has an extensive surface area for trapping particles, e.g., by having many folds, or that operates to filter throughout its volume or depth. The polishing filter preferably is a depth filter, which enables the filtering out of fine particles from the water, not only at the surface of the filter but throughout its depth.

In a preferred embodiment, the filter consists of a support structure and a filtration material which is contained in the support structure. The support structure preferably is porous, retaining the filtration material and permitting water to flow through the filtration material and through the support structure. In a typical embodiment, the filtration material has depth, in the support structure, of more than about 3 mm.

The support structure typically is an inexpensive mesh, cloth, or paper material. Useful filtration materials typically include particles, fibers, or combinations thereof. Wools are a suitable filtration material, preferably wools made from a high temperature tolerant synthetic fiber, and more preferably PET-wool. Fine sand and Kieselguhr also are preferred filtration materials. The filtration material should provide free passage of water through it while collecting substantial quantities of particles within its pores.

Preferred Embodiment of the Cartridge

Figure 2A:
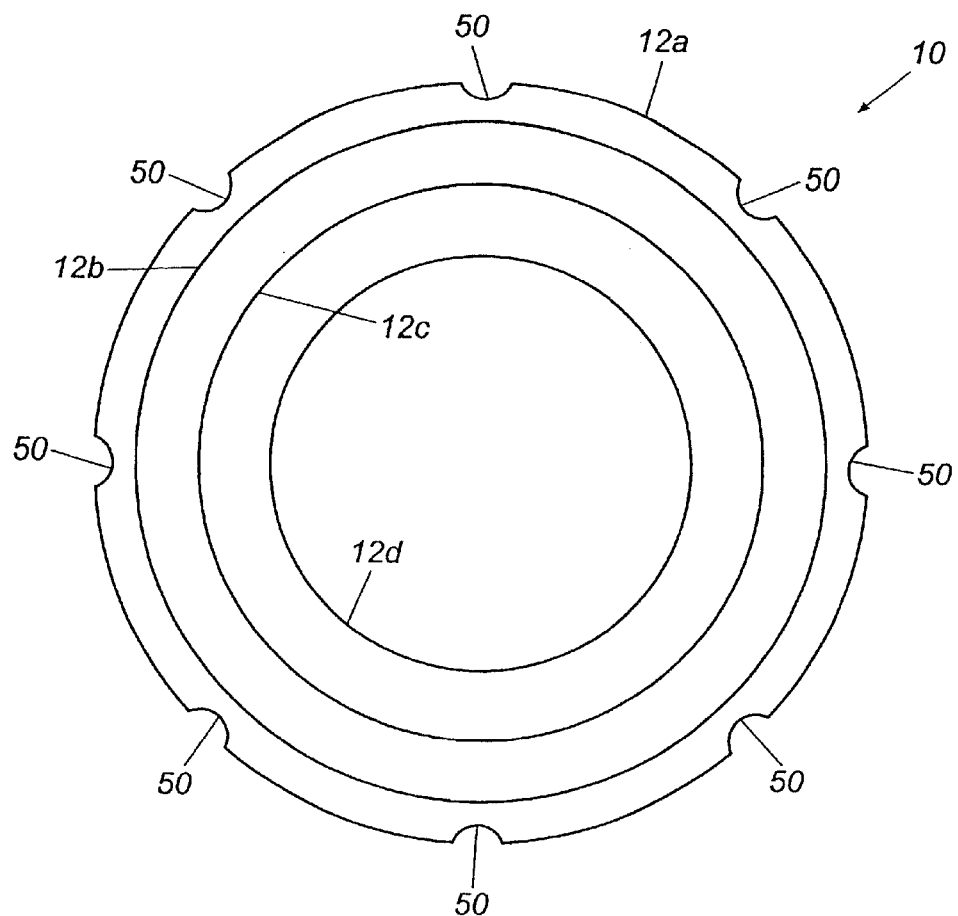
FIG. 2A is a horizontal sectional view of a preferred embodiment of the cartridge, indicating the means which enable expansion of the circumference of the cartridge to contact a circumferentially-mounted external heater.
Figure 2B:
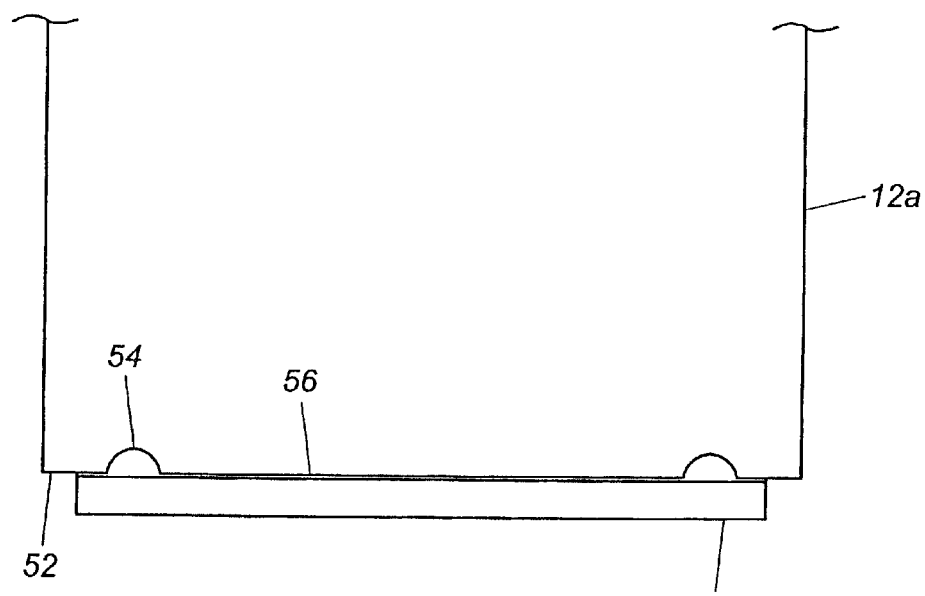
FIG. 2B is a vertical sectional view of the base of a preferred embodiment of the cartridge, indicating the means which enable expansion of the base of the cartridge to contact a base-mounted external heater.

FIGS. 1, 2A, and 2B illustrate one embodiment of the cartridge including a polishing filter. The construction of the cartridge 10, which consists of several containers (i.e. 12a, 12b, 12c, and 12d) mounted within each other, enables low-cost manufacture, because the inexpensive mass production of open top metal containers is state-of-the-art and the assembly operation is relatively simple. The containers can be made from relatively simple materials, for example, tinned mild steel sheet.

FIG. 1 shows the cartridge 10 which includes four concentrically arranged containers: an outer container 12a, a second intermediate container 12b, a first intermediate container 12c, and an inner container 12d. The first intermediate container 12c is secured in a nested position within the second intermediate container 12b, wherein both intermediate containers are positioned between the outer container 12a and the inner container 12d. All four containers are in spaced apart positions relative to one another. The space between the walls of each container, and between the base of each container, is referred to herein as a gap. The cartridge 10 utilizes spacers or other standard structures (not shown) to maintain relative positions of the inner container 12d, first intermediate container 12c, and second intermediate container 12b, within the outer container 12a.

The outer container 12a includes a closed base 13a, vertical walls 15a, and an open top end 20a which can be engaged against the cartridge headpiece 22 to form a water-tight seal. The cartridge headpiece 22 is a permanent part of the water treatment system and contains the water inlet feedpipe 24, the connection to the water outlet pipe 26, and the cartridge level-control system 28.

The inner container 12d includes a closed base 13d, vertical walls 15d, and a top end 20d that has at least one opening through which untreated water can flow into the inner container 12d. The vertical walls 15d of inner container 12d have a series of horizontally disposed apertures 16d (two are shown) spaced around the circumference of the vertical walls 15d.

The second intermediate container 12b includes a closed base 13b, vertical walls 15b, and an open top end 20b. The vertical walls 15b have a series of horizontally disposed apertures 16b (only two are shown) spaced around the circumference of the vertical walls 15b.

The first intermediate container 12c includes a closed base 13c, vertical walls 15c, and an open top end 20c, which has a rim which serves as a weir over which water flowing out of the first intermediate container 12c flows before passing into the second intermediate container 12b.

A water inlet feedpipe 24 is located in the center of the cartridge 10 and a water outlet pipe 26 is located near, or in an alternative embodiment, in, the vertical wall of the outer container 12a, so that the two pipes are physically separated. The inlet feedpipe 24 preferably is a relatively short, large diameter pipe, which terminates in the cartridge 10 above a water level line 40. In addition, the top ends 20b and 20d of the walls of the second intermediate container 12b and the inner container 12d, respectively, are close in height to the top end 20a of the outer container 12a, forming a narrow gap against the cartridge headpiece 22, so that water splash or droplets cannot enter the outgoing water stream in the outlet pipe 26. The inner container 12d is provided with an optional partial cover 34, which further enhances the separation between the water inlet feedpipe 24 and the outlet pipe 26. The water inlet feedpipe 24 can be placed above the water level 40 and can be shortened to reduce the exposure of incoming untreated water to heat, thereby reducing the tendency of particle deposits forming within inlet feedpipe 24, which could undesirably block the flow of incoming water.

The cartridge 10 includes a heater 32 that is mounted internally to the base 13a of the outer container 12a (shown in FIG. 1) or in the vertical gap between containers 12a and 12b (not shown). Alternatively, the cartridge can include a heater 32a that is externally mounted to the base 13a of the outer container 12a as shown in FIG. 1. In still another configuration, an external heater can be placed into contact with the outer vertical wall of the outer container 12a. In any of these optional heater positions, heat is first applied to the treated water in order to protect heater 32, 32a from the particle deposition that it would otherwise incur if contacting untreated water, i.e. water inside containers 12d, 12c, or 12b.

An annular-shaped polishing filter 30 is positioned in the gap between the vertical wall 15a of the outer container 12a and the vertical wall 15b of the second intermediate container 12b, near their top ends 20a and 20b.

FIG. 2A shows a section through the cartridge 10 (section A—A in FIG. 1). The circumferential wall of the outer container 12a has several grooves 50 along most or all of the container's height. These grooves 50 enable the circumferential wall of the outer container 12a to expand under pressure. Since he cartridge 10 normally operates under higher-than-atmospheric pressure due to the heat applied to the water within it, the grooves 50 enable the walls of outer container 12a to expand outward and tightly contact a heater or heaters (not shown) mounted around its circumference, thereby ensuring good thermal contact. When the heat is turned off to exchange the cartridge 10 after it becomes spent, the normal circumferential "springiness" of the walls of the outer container 12a enables the walls to return approximately to their non-expanded position, thus facilitating the withdrawal of the cartridge 10.

FIG. 2B shows a section of the base 52 of the outer container 12a with a heater 32a mounted against the base 52. A circular groove 54 is provided in the base 52 radially about most, or all, of a central axis normal to the plane of the base. When heat is applied to the cartridge 10 and the cartridge's internal pressure rises above atmospheric pressure, the central circular portion 56 of the base 52 is forced outward to provide good thermal contact with the externally-mounted base heater 32a.

Figure 3:
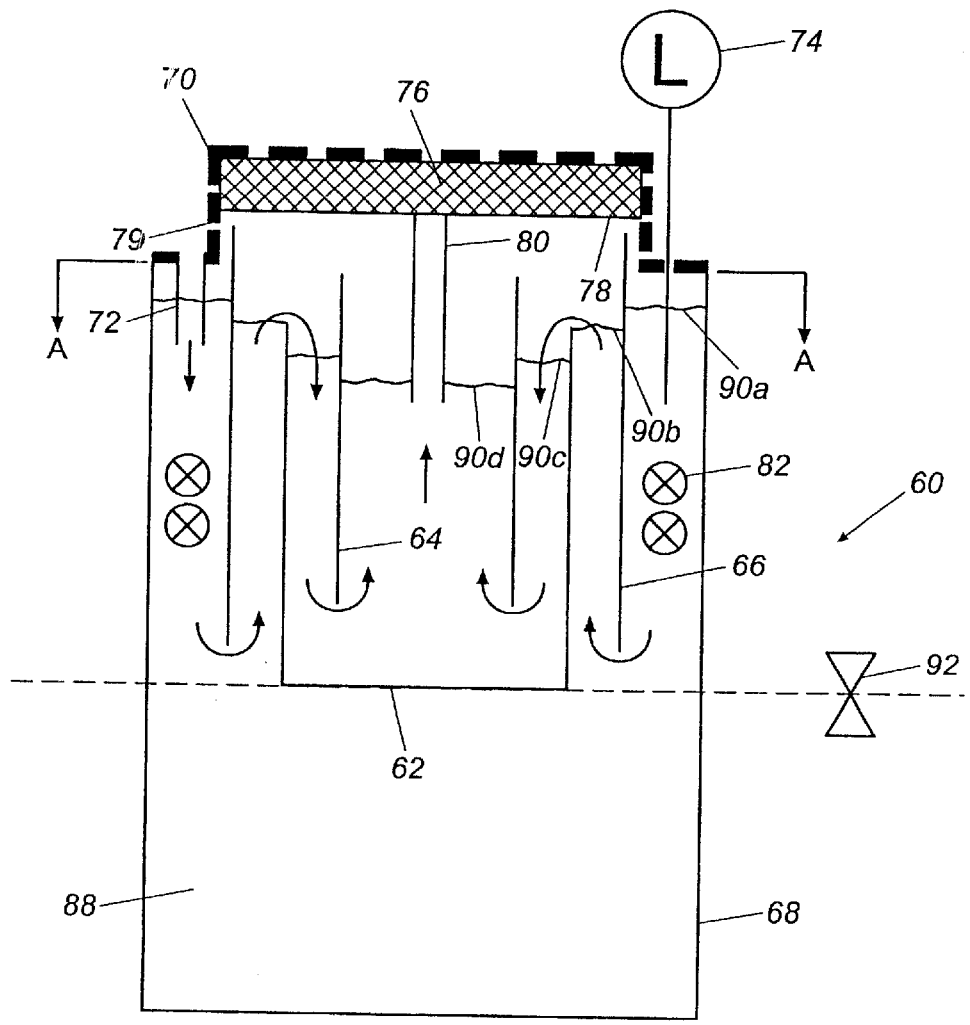
FIG. 3 is a vertical sectional view of a more preferred embodiment of the cartridge, indicating the water flow paths.
Figure 3A:
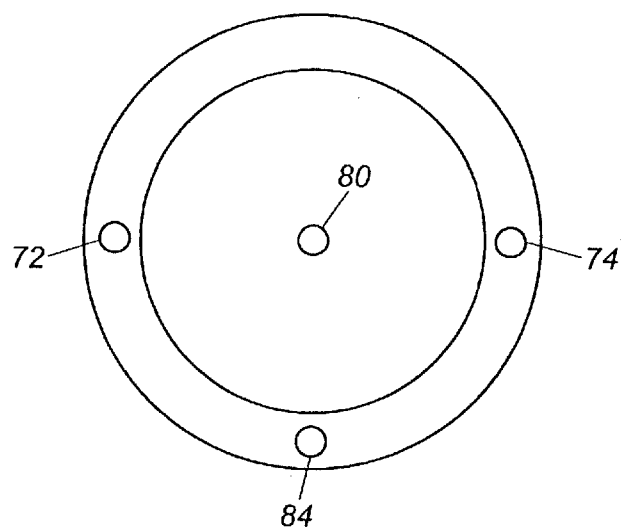
FIG. 3A is a horizontal sectional view of the cartridge shown in FIG. 3.

A more preferred embodiment of the cartridge is shown in FIGS. 3 and 3A. FIG. 3 shows a cartridge 60, which includes an inner container 62 (having a closed base and open top), an inner baffle 64 (which is in the form of an open-ended tube), an outer baffle 66 (similarly constructed to inner baffle 64), and an outer container 68 (having an open top and closed base). The containers 62, 68 and the baffles 64, 66 are concentrically mounted and appropriately spaced within each other, using spacers (not shown). The bottom portion of the outer container 68 forms the particle settling chamber 88.

Cartridge 60 is shown abutting a cartridge head-piece 70 (the edge of which is shown). The cartridge head-piece 70 fulfills a similar function as that described above for the cartridge head-piece 22 shown in FIG. 1. The cartridge head-piece 70 is a permanent part of the water treatment system (not shown) and contains a water inlet feedpipe 72, a level control system 74, and a conduit for the release of vapors evolved during the treatment process (not shown). A polishing filter 76 is provided in a filter housing 78. The polishing filter 76 functions identically to the polishing filter 30 described above and shown in FIG. 1, but polishing filter 76 has a circular, rather than annular, shape. The filter housing 78 is fitted with a filter inlet tube 80 and an outlet at the opposite side of the filter, communicating with cartridge head-piece 70.

The cartridge 60 further includes an internal heater 82, which functions similarly to internal heater 30 shown in FIG. 1 and described above. However, internal heater 82 is in the form of annular coil so that it fits in the annular space between the outer baffle 66 and the outer container 68. Internal heater 82 is attached to the cartridge head-piece 70 by means of a heater holder 84, which contains the power supply (not shown) to internal heater 82 and is a permanent part of the cartridge head-piece 70.

The outer baffle 66 fits within the housing inner bore 79 of filter housing 78. The gap between the outer baffle 66 and the housing inner bore 79 is nominal (i.e. small and convoluted), so that there is little or no risk that incoming, untreated water can by-pass the water flow path (described below). The nominal gap ensures that the vapors inside the outer baffle 66 adequately communicate with vapors outside the outer baffle 66, ensuring no pressure difference between the vapor headspaces on either side of the outer baffle 66. This in turn ensures that the desired, stepped flow occurs (as described below).

Compared with the cartridge arrangement shown FIG. 1, the arrangement shown in FIG. 3 has the advantage of enabling a permanent internal heater, as well as reducing the number of containers needed. Since the other components of the cartridge no longer are required in the heat transfer process, they can be constructed of non-metallic materials, such as a plastic.

Operation of the Cartridge

In The FIG. 1 Design

The general course through which the water flows from inlet feedpipe 24 to outlet pipe 26 is the water flow path. The particle settling zone 17, the section of cartridge 10 below level line 42, preferably is a turbulence free zone, which permits particles to settle and accumulate undisturbed by water flow. A plane in which apertures 16b and 16d approximately lie define the planar upper boundary of settling zone 17. The long flow path provides efficient settling and collection of the particles, functions which are enhanced because the design provides that 50% of the flow path is directed down which is the same direction as that of particle settling (i.e. the direction of gravitational forces). The container-in-container construction forces all of the water to follow a fixed, predetermined flow path.

In operation, raw (untreated) water enters through inlet feedpipe 24, progresses into inner container 12d, and then flows down to and through apertures 16d, up to overflow top end 20c, down to and through apertures 16b, up through annular polishing filter 30. The treated water leaving polishing filter 30 then exits the cartridge assembly 10 via outlet pipe 26. (See flow arrows A through E.)

The untreated water enters cartridge 10 where it is heated by heater 32 or 32a, causing bicarbonate hardness to precipitate in the water. Heat is applied first to the treated water in order to avoid particle deposition that would reduce the efficiency of the heater. Moreover, the cartridge provides good contact between an externally-mounted heater and cartridge walls by enabling the walls to expand under normal cartridge operating pressure and to firmly contact the surface of the heater. The cartridge provides that the incoming and outgoing streams of water are arranged to eliminate the possibility of the two streams mixing inadvertently—thus eliminating the risk of contaminating the treated water with untreated water.

At least a portion of the particles in the heated water in inner container 12d settle towards base 13d. Water, and whatever particles do not settle in inner container 12d, the flow through apertures 16d and into first intermediate container 12c. An additional portion of particles in the heated water in first intermediate container 12c can settle towards base 13c. Water, and whatever particles do not settle in first intermediate container 12c, then flow up and over the rim of top end 20c and then into second intermediate container 12b. An additional portion of particles in the heated water in second intermediate container 12b can settle towards base 13b. Water, and whatever particles do not settle in second intermediate container 12b, then flow through apertures 16b and into outer container 12a. An additional portion of particles in the heated water in outer container 12a can settle towards base 13a. Water then flows up through annular polishing filter 30, which traps any remaining particles which have not settled, and then flows out of cartridge 10 through outlet pipe 26.

Since the water flows substantially only above the section of cartridge 10 defined by level line 42, the remaining section of the cartridge, below level line 42, is free to collect and accumulate solid particles, particularly those formed due to the reaction of the bicarbonate hardness of the untreated water. When the particles accumulate to level line 42, further particle settling ultimately blocks apertures 14b and/or 16d, thus preventing continued water flow. This blockage enforces replacement of cartridge 10, which is then "spent", having reached a state in which further accumulation of particles in the cartridge would reduce the residence time necessary for complete treatment (which is defined by the volumetric capacity above level line 42).

Volatile impurities in the untreated water collect in the gaseous headspace of the cartridge above level line 40. This part of the treatment process is substantially as described in U.S. Pat. No. 5,858,248, which is incorporated herein in its entirety. The accumulated volatile impurities reduce the level of level line 40. This reduction in level line 40 is detected by level control 28 and a vent system within cartridge head-piece 22 operates to release the accumulated volatile impurities and thus maintain the required level of level line 40. (This function of the cartridge head-piece is described in U.S. Pat. No. 5,858,248 and need not be further described herein.) In order to enable flow, the water level in inner container 12d will be slightly higher than the water level in container 12c, which will be slightly higher than the water level in 12b, which will be slightly higher still than the water level in container 12a, the lowest level. These stepwise reduction of levels is necessary to maintain a hydraulic gradient. Because the water flow through cartridge 10 is relatively small, the hydraulic gradient described is also small. Accordingly, a single water level 40 is shown in FIG. 1.

In the FIG. 2 Design

The water levels within the cartridge are shown in FIG. 3, using exaggerated steps (levels) 90a, 90b, 90c, and 90d for greater clarity. Untreated water enters via the water inlet feed-pipe 72 and flows downward in the annular space between the outer container 68 and the outer baffle 66, past internal heater 82. The water then flows up in the annular space between the outer baffle 66 and the inner container 62, and overflows into the inner container 62. Particles that precipitate (due to heating via internal heater 82) settle mainly in the settling chamber 88, which is below level line 92, with very few carrying over to settle in the inner container 62. The water then flows down through the annular space between the inner container 62 and the inner baffle 64, and finally flows upward through the inner baffle 64 to the filter inlet tube 80. The water flow becomes blocked when the precipitated solids accumulate substantially above water level line 92, thereby both signaling and necessitating a cartridge change.

Modifications and variations of the methods and devices described herein will be obvious to those skilled in the art from the foregoing detailed description. Such modifications and variations are intended to come within the scope of the appended claims.

I claim:

1. A cartridge device for use in a heated cartridge water treatment system comprising an outer container having a closed base, an open top end, and vertical walls disposed between the base and the top end, wherein the open top end can be sealably engaged with a headpiece of the heated cartridge water treatment system;

an inner container having a closed base, a top end having at least one opening through which water to be treated can flow into the inner container, and vertical walls disposed between the base and the top end, wherein the vertical walls of the inner container are provided with at least one aperture through which water in the inner container can flow out of the inner container, a particle settling zone being defined between the aperture and the base of the inner container, and wherein the inner container is secured within the outer container in a position forming a gap between the walls of the outer container and the walls of the inner container and a gap between the base of the outer container and the base of the inner container; and a treated water outlet positioned for receiving water from the gap between the top end of the outer container and the top end of the inner container, wherein water flowing out from the aperture of the inner container can flow out of the cartridge device through the treated water outlet, thereby defining a water flow path through the cartridge device.

2. The cartridge device of claim 1, further comprising at least one intermediate container disposed between the outer container and the inner container, the intermediate container having a closed base, an open top end, and vertical walls disposed between the base end and the top end, wherein water in the water flow path flows through one or more apertures in the walls of the intermediate container or over the top end of the intermediate container.

3. The cartridge device of claim 2 comprising a pair of intermediate containers having a first intermediate container disposed within a second intermediate container, wherein the first intermediate container is secured within the second intermediate container in a position forming a gap between the walls of the first intermediate container and the walls of the second intermediate container and a gap between the base of the first intermediate container and the base of the second intermediate container.

4. The cartridge device of claim 3, wherein the top end of the first intermediate container is lower than the top end of the inner container and lower than the top end of the second intermediate container, the top end of the first intermediate container having a rim over which water in the flow path can flow.

5. The cartridge device of claim 4, wherein the vertical walls of the second intermediate container are provided with at least one aperture through which water in the flow path can flow.

6. The cartridge device of claim 5, wherein the walls of the inner container and the walls of the second intermediate container each comprise two or more apertures, the apertures approximately defining a planar upper boundary of the particle settling zone.

7. The cartridge device of claim 6, further comprising a heater mounted to the outer container; and a filter positioned near the treated water outlet and in the gap between the outer container and the inner container, such that the water flow path is through the filter.

8. The cartridge device of claim 7, wherein one or more of the walls of the inner container, outer container, first intermediate container, and second intermediate container are substantially cylindrical in shape.

9. The cartridge device of claim 3, wherein the vertical walls of the inner container and the vertical walls of the intermediate container each substantially form a cylinder, the cylinders being concentrically disposed.

10. The cartridge device of claim 9, further comprising an annularly shaped filter which fills the gap between the outer container and the second intermediate container, such that the water flow path is through the filter.

11. The cartridge device of claim 10, further comprising a depth filter disposed between the outer container and the inner container.

12. The cartridge device of claim 2, wherein the inner container, the outer container, and the at least one intermediate container are coated with an anti-corrosion lacquer.

13. The cartridge device of claim 1, further comprising a heater mounted to the outer container.

14. The cartridge device of claim 13, wherein the heater is mounted to the base of the outer container.

15. The cartridge device of claim 14, wherein the heater is positioned between the base of the outer container and the base of the inner container.

16. The cartridge device of claim 14, wherein the heater is mounted on an outer surface of the base of the outer container.

17. The cartridge device of claim 1, wherein the walls of the outer container substantially form a cylinder.

18. The cartridge device of claim 17, wherein the outer container includes one or more substantially axially oriented grooves extending substantially the length of the walls between the base and the top end of the outer container.

19. The cartridge device of claim 17, wherein the base of the outer container comprises a circular groove positioned radially about a central axis normal to the base of the outer container.

20. The cartridge device of claim 1, wherein about 50% of the water flow path is in the same direction as the direction in which particles in the cartridge settle under the influence of gravitational forces.

21. The cartridge device of claim 1, further comprising a filter positioned near the treated water outlet and in the gap between the outer container and the inner container, such that the water flow path is through the filter.

22. A cartridge device for use in a heated cartridge water treatment system comprising an outer container having a closed base, an open top end, and vertical walls disposed between the base and the top end, wherein the open top end can be sealably engaged with a headpiece of the heated cartridge water treatment system;

an inner container having a closed base, an open top end, and vertical walls disposed between the base and the top end, wherein the inner container is secured within the outer container in a position forming a gap between the walls of the outer container and the walls of the inner container and a gap between the base of the outer container and the base of the inner container, a particle settling zone being defined between the base of the inner container and the base of the outer container;

one or more outer baffles secured in the gap between the walls of the outer container and the walls of the inner container, and defining a flow path such that when untreated water enters the cartridge through an inlet feedpipe, said untreated water flows between the wall of the outer container and at least one of said outer baffles toward the particle settling zone and then passes between the at least one of said outer baffles and the wall of the inner container; and a treated water outlet positioned for receiving water from the top end of the inner container, wherein water flowing out from the inner container can flow out of the cartridge device through the treated water outlet, thereby defining a water flow path through the cartridge device.

23. The cartridge device of claim 22, further comprising one or more inner baffles secured within the inner container, said one or more inner baffles being positioned to extend the water flow path between the open end of the inner container and the treated water outlet.

24. The cartridge device of claim 22, wherein the vertical walls of the inner container and the vertical walls of the outer container each substantially form a cylinder, the cylinders being concentrically disposed.

25. The cartridge device of claim 22, further comprising a heater positioned between the walls of the outer container and at least one of the outer baffles.

26. The cartridge device of claim 25, wherein the heater is in the form of an annular coil.

27. The cartridge device of claim 22, further comprising a polishing filter in communication with the treated water outlet.

28. A method of treating water comprising providing the cartridge device of claim 1, introducing water into the at least one opening of the top end of the inner container;

heating the water in the inner container to break down bicarbonate hardness in the water to precipitate particles;

collecting at least some of the precipitated particles in the settling zone, separating the particles from the heated water to produce treated water; and discharging the treated water from the treated water outlet.

29. The method of claim 28, wherein the cartridge device further comprises a pair of intermediate containers disposed between the outer container and the inner container, the intermediate containers each having a closed base, an open top end, and vertical walls disposed between the base end and the top end, wherein water in the water flow path flows through one or more apertures in the walls of the intermediate containers or over the top end of the intermediate containers, the pair of intermediate containers having a first intermediate container disposed within a second intermediate container, wherein the first intermediate container is secured within the second intermediate container in a position forming a gap between the walls of the first intermediate container and the walls of the second intermediate container and a gap between the base of the first intermediate container and the base of the second intermediate container, wherein the top end of the first intermediate container is lower than the top end of the inner container and lower than the top end of the second intermediate container, the top end of the first intermediate container having a rim over which water in the flow path can flow, the vertical walls of the second intermediate container being provided with at least one aperture through which water in the flow path can flow, and the walls of the inner container and the walls of the second intermediate container each comprising two or more apertures, the apertures approximately defining a planar upper boundary of the particle settling zone.

30. The method of claim 29, further comprising a heater mounted to the outer container and a filter positioned near the treated water outlet and in the gap between the outer container and the inner container, such that the water flow path is through the filter.

31. A method of treating water comprising providing the cartridge device of claim 22, introducing water into the top end of the outer container;

heating the water in the outer container to break down bicarbonate hardness in the water to precipitate particles;

collecting at least some of the precipitated particles in the settling zone, separating the particles from the heated water to produce treated water; and discharging the treated water from the treated water outlet.

32. A water treatment system comprising a housing having a headpiece, an inlet water connection, and an outlet water connection;

a removable, disposable cartridge which comprises an outer container having a closed base, an open top end, and vertical walls disposed between the base and the top end, wherein the open top end can be sealably engaged with the headpiece of the housing;

an inner container having a closed base, a top end having at least one opening in fluid communication with the inlet water connection of the headpiece, and vertical walls disposed between the base and the top end, wherein the vertical walls of the inner container are provided with at least one aperture through which water in the inner container can flow out of the inner container, a particle settling zone being defined between the aperture and the base of the inner container, and wherein the inner container is secured within the outer container in a position forming a gap between the walls of the outer container and the walls of the inner container and a gap between the base of the outer container and the base of the inner container;

a treated water outlet positioned in the gap between the top end of the outer container and the top end of the inner container, the treated water outlet being in fluid communication with outlet water connection of the headpiece; and a heater means for heating water when flowing through the cartridge.

33. The water treatment system of claim 32 further comprising a polishing filter in the cartridge.

34. The water treatment system of claim 32, further comprising a level control means for maintaining a water level in the cartridge.

35. A water treatment system comprising a housing having a headpiece, an inlet water connection, and an outlet water connection;

a removable, disposable cartridge which comprises
  an outer container having a closed base, an open top end, and vertical walls disposed between the base and the top end, wherein the open top end can be sealably engaged with the headpiece of the housing;
  an inner container having a closed base, a top end having at least one opening in fluid communication with the outlet water connection of the headpiece, and vertical walls disposed between the base and the top end, wherein the inner container is secured within the outer container in a position forming a gap between the walls of the outer container and the walls of the inner container and a gap between the base of the outer container and the base of the inner container, a particle settling zone being defined between the base of the inner container and the base of the outer container;
  one or more outer baffles secured in the gap between the walls of the outer container and the walls of the inner container, and defining a flow path such that untreated water entering the cartridge through the water inlet connection flows between wall of the outer container and at least one of said outer baffles toward the particle settling zone and then passes between the at least one of said outer baffles and the wall of the inner container; and
  a treated water outlet positioned in the gap between the top end of the outer container and the top end of the inner container, the treated water outlet being in fluid communication with the outlet water connection of the headpiece; and
  a heater means for heating water when flowing through the cartridge.

36. The water treatment system of claim 35, further comprising a level control means for maintaining a water level in the cartridge.

37. The water treatment system of claim 35 further comprising a polishing filter in the cartridge.

* * * * *